(12) United States Patent
Feron et al.

(10) Patent No.: US 7,591,878 B2
(45) Date of Patent: Sep. 22, 2009

(54) MEMBRANE GAS SEPARATION

(75) Inventors: Paul Hubert M. Feron, Apeldoorn (NL); Vladimir Vasilevich Volkov, Moscow (RU); Valery Samuilovich Khotimsky, Moscow (RU); Vladimir Vasil'evich Teplyakov, Moscow (RU)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 11/617,842

(22) Filed: Dec. 29, 2006

(65) Prior Publication Data

US 2007/0214957 A1 Sep. 20, 2007

Related U.S. Application Data

(63) Continuation of application No. PCT/NL2005/000465, filed on Jul. 1, 2005.

(30) Foreign Application Priority Data

Jul. 1, 2004 (NL) .................................. 1026537

(51) Int. Cl.
*B01D 53/22* (2006.01)
*B01D 19/00* (2006.01)
*B01D 71/44* (2006.01)

(52) U.S. Cl. ....................... 95/46; 95/51; 96/6; 96/8; 96/10; 96/11; 96/13; 96/14; 210/640

(58) Field of Classification Search ............ 95/45, 95/46, 51, 186, 187, 236; 96/8, 10, 11, 12, 96/13, 14, 6; 210/640
See application file for complete search history.

(56) References Cited

U.S. PATENT DOCUMENTS

| | | | | | |
|---|---|---|---|---|---|
| 4,859,215 | A | * | 8/1989 | Langsam et al. | 95/51 |
| 4,952,219 | A | * | 8/1990 | DiMartino, Sr. | 95/51 |
| 5,066,314 | A | * | 11/1991 | Leites et al. | 95/236 |
| 5,281,255 | A | * | 1/1994 | Toy et al. | 95/50 |
| 5,336,298 | A | * | 8/1994 | Quinn et al. | 95/51 |
| 5,707,423 | A | * | 1/1998 | Pinnau et al. | 95/45 |
| 6,929,680 | B2 | * | 8/2005 | Krushnevych et al. | 95/236 |
| 2002/0014154 | A1 | * | 2/2002 | Witzko et al. | 95/178 |

FOREIGN PATENT DOCUMENTS

| RU | SU 1637850 | | 3/1991 |
|---|---|---|---|
| SU | 1637850 | A1 * | 3/1991 |

OTHER PUBLICATIONS

Teplyakov et al., "Lab-scale bioreactor integrated with active membrane system for hydrogen production: experience and prospects," *Int'l J. Hydrogen Energy*, 27:1149-1155 (2002).
English abstract of SU 1,637,850.

* cited by examiner

*Primary Examiner*—Jason M Greene

(57) ABSTRACT

The invention relates to gas separation, in particular to separation of $CO_2$ from $CO_2$-rich liquids, particularly from $CO_2$ absorption liquids used in the removal of $CO_2$ from off-gases or product flows, such as natural gas or synthesis gas.

According to the invention, $CO_2$ is separated from a $CO_2$-rich liquid by a method comprising a step wherein, under elevated pressure, said liquid is contacted with a membrane based on polyacetylene substituted with trimethylsilyl groups such that the pressure across the membrane is at least 1 bar and that at least a part of the $CO_2$ is transported from the liquid through the membrane.

13 Claims, 5 Drawing Sheets

MEMBRANE GAS SEPARATION

CROSS REFERENCE TO RELATED APPLICATIONS

This application is a continuation of PCT application no. PCT/NL2005/000465, designating the United States and filed Jul. 1, 2005; which claims the benefit of the filing date of Dutch application no. NL 1026537, filed Jul. 1, 2004; both of which are hereby incorporated herein by reference in their entirety.

FIELD

The invention relates to gas separation with the aid of membranes, in particular to separation of $CO_2$ from $CO_2$-rich liquids, particularly from $CO_2$ absorption liquids used in the removal of $CO_2$ from off-gases or product flows, such as natural gas or synthesis gas.

BACKGROUND

In practice, gas separation (particularly $CO_2$ separation, for instance for $CO_2/H_2$ separation or with natural gas treatment) is carried out at high pressure, by using absorption liquids. Such processes are based on absorption under high pressure, followed by desorption at low pressure. In the desorption step, the gas bubbles spontaneously from the absorption liquid. Usually, the gas then needs to be recompressed for the benefit of the follow-up processes. This is energetically undesirable. In order to then bring the absorption liquid to the absorption pressure, recompression of the liquid is necessary, which is also energetically undesirable. In addition, due to the low pressure, the equipment for the desorption process usually needs to have the same size as the equipment for the absorption process. The absorption and desorption steps are carried out in separate devices, so that the investment costs are high. To sum up, the known high-pressure absorption processes have energetic drawbacks, they are sizable and result in high investment costs. This makes them unsuitable for, for instance, small-scale gas treatment applications, such as for instance fuel cells.

SUMMARY

The present invention contemplates providing a method for separating gases from liquids which does not have the above-mentioned drawbacks.

It has been found that this can be fulfilled by using a specific membrane, while the $CO_2$-charged liquid (that is, the absorption liquid with $CO_2$ dissolved therein) is contacted with the membrane under high pressure (that is, the pressure difference across the membrane is at least 1 bar).

Therefore the invention relates to a method for separating $CO_2$ from a $CO_2$-rich liquid, comprising a step in which, under elevated pressure, this liquid is contacted with a membrane based on polyacetylene substituted with trimethylsilyl groups, while the pressure difference across the membrane is at least 1 bar and while at least a part of the $CO_2$ is transported from the liquid through the membrane.

DETAILED DESCRIPTION OF CERTAIN PREFERRED EMBODIMENTS

Figure 1:
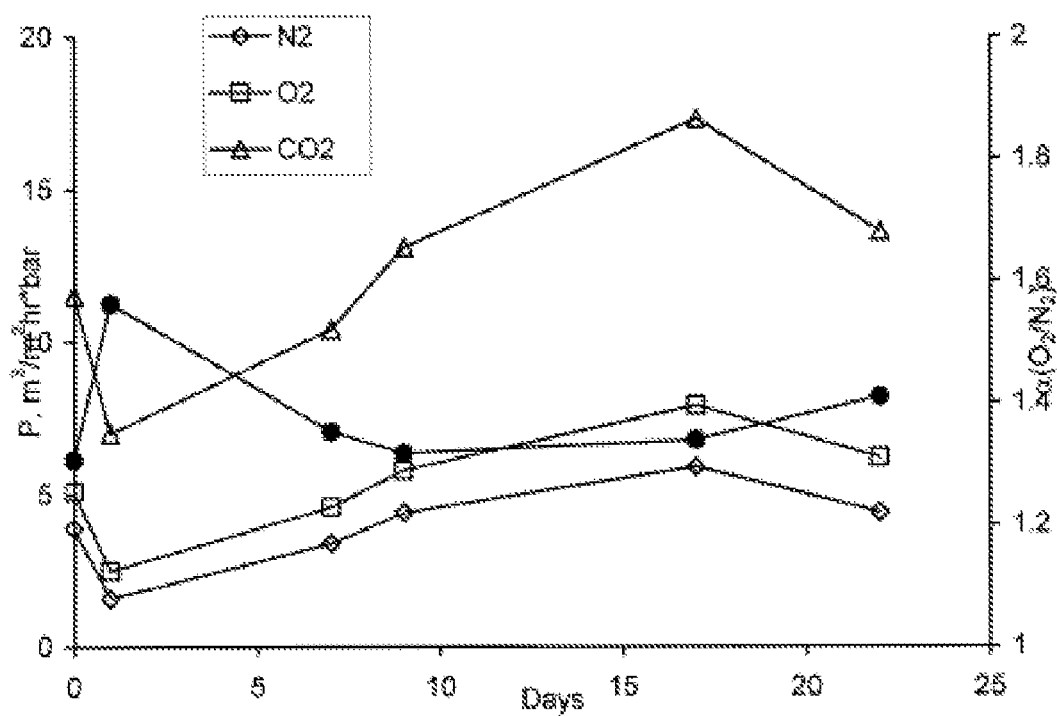
FIG. 1 graphically depicts the change in the permeability of the Accurel™ PP Q3/2 membrane coated with PTMSP.

It has surprisingly been found that, with a high transmembrane pressure difference, with different absorption liquids, the membranes based on polyacetylene substituted with trimethylsilyl groups are impermeable to the absorption liquid. This makes degassing of the liquid at high pressure possible. Suitable material for manufacturing the membranes according to the invention can be described by Formula (1):

$$\ce{-[C(R)=C(A)]_n-} \tag{1}$$

in which

R=trialkylsilyl, preferably trimethylsilyl (TMS, Si$(CH_3)_3$);

A=alkyl or fluorinated alkyl (that is, an alkyl group in which at least one H-atom is replaced by an F-atom); and n=a whole number from 500 to 500,000, preferably 1000 to 10,000.

Examples of such materials are polymethylpentyne and poly(trimethylgermylpropyne). However, preferably poly(1-trimethylsylilpropyne), PTMSP, is used, for which it holds true that: R=TMS and A=methyl, while A is optionally fluorinated. Membranes manufactured from this material are known per se and are, for instance, described in US-A-2002/0 014 154. However, the use of PTMSP membranes for separation under high pressure, like the use according to the present invention, is not mentioned or suggested in this publication.

The separation of gas mixtures by means of a film is known from U.S. Pat. No. 1,637,850. However, gas absorption under high pressure is not described therein.

Fluorinated polymers according to formula (1) are particularly suitable if the membrane needs to have a low surface tension, for instance to prevent liquid from penetrating the membrane. In this respect, it is noted that it usually presents no problems, however, if the liquid penetrates into the material, as long as the liquid does not pass through the membrane. It has surprisingly been found that, after some initial uptake of liquid, after being saturated, the membranes usually adequately stop the liquid, as described hereinabove. Without wishing to be bound to any theory, it is assumed that contacting the liquid with the membrane under high pressure actually contributes to reinforcing the structure of the membrane. This is the more surprising since the polymers according to Formula (1) are characterized by a high free volume, of which it was assumed that this was associated with poor mechanical properties, in particular if the membrane is exposed to high temperatures. It is therefore assumed that the high liquid pressure actually prevents the structure of the membrane from "collapsing."

The membranes according to the invention wholly or partly consist of the substituted polyacetylene according to Formula (1). It has been found that, with these polymers, membranes with a very suitable permeability coefficient can be manufactured. The permeability coefficient for $CO_2$ of the membranes used according to the invention is preferably at least 500 Barrer, more preferably at least 3000 Barrer. As is conventional, the permeability coefficient is expressed in the unit Barrer, for which it holds true that:

$$1 \text{ Barrer} = 10^{-10} \cdot \frac{\text{gas flow rate } [cm^3/s] \cdot \text{membrane thickness } [cm]}{\text{membrane surface } [cm^2] \cdot \Delta p \text{ [cmHg]}} \quad (2)$$

in which $\Delta p$ is the transmembrane pressure difference. Thus defined, the permeability coefficient is a material property and depends on the gas used. The values stated herein relate to $CO_2$. Most preferably, the permeability coefficient is 15,000 to 25,000 Barrer, particularly 17,500 to 22,500 Barrer, for instance 20,000 Barrer.

According to a preferred embodiment, the membrane is provided on a coarse-porous support, in order to further improve the mechanical stability. Suitable supports for this purpose are manufactured from plastic or ceramic material. Very suitable is the embodiment in which the membrane is provided on a hollow-fiber membrane. If the pressure drop across the membrane is not too high, for instance smaller than 5 bar, a plastic (for instance polypropene) support suffices, preferably a plastic (such as polypropene) hollow-fiber membrane. For pressures higher than 5 bar, for instance pressures of 25 bar, ceramic supports, for instance ceramic hollow-fiber membranes, are more suitable.

As stated, the transmembrane pressures used are higher than 1 bar. In the most practical embodiment, pressure differences across the membrane of 1 to 40 bar are preferred, but this can differ from use to use. For instance, in the extraction of natural gas, initial pressures (that is, in a "fresh" field) of some hundreds of bar are not unusual. Also at such high pressures, of up to for instance 100, 200 or more bar, the removal of $CO_2$ according to the invention can still be used advantageously.

As liquid in which the gas ($CO_2$) is dissolved according to the invention, in principle any organic or inorganic liquid conventional for this purpose can qualify. Suitable organic liquids include propylene carbonate, polyethylene glycol dimethyl ether (PEG-DME), for instance Selexol™ (PEG/DME-mixture), N-methylpyrrolidone (Purisol™), methanol at low temperatures (Rectisol™), glycerine triacetate, tributyl phosphate, methyl cyanoacetate. An inorganic liquid is water, optionally supplemented with carbonate salts, phosphate salts, amino acid salts or amines.

The method according to the invention can easily be carried out in devices which can relatively simply be fitted in existing apparatuses. In this manner, the method according to the invention may, for instance, be part of a $CO_2/H_2$ separation step (which is, for instance, part of a synthesis gas apparatus) or a $CO_2/CH_4$ separation step (for instance in natural gas production facilities).

The method according to the invention thus enables an integrated membrane gas absorption and desorption process for high-pressure applications. Such an integrated process may, for instance, be carried out in a vessel with connections for feed gas, purified gas and $CO_2$ product gas. Absorption and desorption take place at a same pressure, which is slightly above the pressure of the feed gas, so that no bubble formation occurs in the liquid. This means that the required pump energy for the liquid is limited to the energy for circulation and no pump energy is required to bring the liquid to the absorption pressure. It is further possible for the permeate to be released at a higher pressure. This effect can be increased further by increasing the temperature of the absorption liquid for the desorption.

In addition, according to the invention, absorption and desorption can take place in an integrated high-pressure device, whereas, according to the state of the art, two devices are necessary. By using membrane contactors, a device according to the invention may have a small size, while only connections are needed for discharging and feeding the supply and discharging permeate. Optionally, there may be connections for heat exchangers and stripping gas. Such a device can very suitably be used in $CO_2/H_2$ separations (fuel cells, chemical industry), which are based on physical absorbents. The invention can also be used advantageously in natural gas purification.

The invention will be elucidated on the basis of the following examples.

EXAMPLES

In the following example, inter alia the manufacture of a PTMSP for normal and fluorinated polymers is described, as well as the provision of a cover layer of existing membranes (polypropene and ceramic). The characterization of membranes by determining the gas separation properties is discussed as well. Further, static experiments are carried out with overpressure on the liquid side (propylene carbonate, water, carbonate solutions), while the stability of the membranes is illustrated as well.

Example 1

Preparation of Polymers, Gas Permeation Properties and Stability with Respect to Organic Absorbents 1-trimethylsilyl-1-propyne monomer was synthesized via an organomagnesium method, using trimethylchlorosilane and hydrocarbons of a methyl acetylene-only fraction.

Polytrimethylsilylpropyne was synthesized with $NbCl_5$ as a catalyst or $TaCl_5/Al(I-Bu)_3$ as a catalyst. Fluorine-containing PTMSP-copolymers were manufactured, using trifluoropropyldimethylsilylpropyne as the co-monomer with a $TaCl_5$ or $NbCl_5/Ph_3Bi$ catalytic system. This results in different average molecular weights, as the following Table shows.

| Catalyst system | Mw [/$10^3$ g/mol] (weight-average) | Mw [/$10^3$ g/mol] (volume-average) |
|---|---|---|
| PTMSP $NbCl_5$ | 189-220 | 130-187 |
| PTMSP $TaCl_5/Al(i-Bu)_3$ | 1270-1540 | 1000-1180 |
| TMSP-F-PTMSP copolymer $TaCl_5/Ph_3Bi$ | 2006 | 1640 |
| TMSP-F/TMSP $NbCl_5/Ph_3Bi$ | 430-900 | 180-525 |

The gas permeation properties for $O_2$ and $N_2$ were determined. The gas permeation properties of fluorinated PTMSP film for $O_2$ and $N_2$ were determined as well. The results of a number of samples are in the following Table.

| Catalyst system | Permeability coefficient $O_2$ (Barrer) | Permeability coefficient $N_2$ (Barrer) | $O_2/N_2$ selectivity |
|---|---|---|---|
| PTMSP NbCl$_5$ | 6390-6910 | 3800-4260 | 1.65-1.68 |
| PTMSP TaCl$_5$/Al(i-Bu)$_3$ | 7900-8830 | 5200-5750 | 1.52-1.54 |
| TMSP-F-PTMSP copolymer TaCl$_5$/Ph$_3$Bi | 630 | 290 | 2.19 |
| TMSP-F/TMSP NbCl$_5$/Ph$_3$Bi | 3090 | 1600 | 1.93 |

The polymer samples were checked for their stability after they were cast from toluene solutions of synthesized PTMSP on cellophane supports. These were subsequently exposed to three different organic absorption liquids: propylene carbonate, N-methylpyrrolidone and methanol for a period of seven days. No solution was observed, which demonstrates that the organic solutions do not damage the PTMSP.

Example 2

The Formation of Asymmetric PTMSP Membranes and the Characterization thereof

Polypropylene hollow fiber membranes and ceramic membranes were coated with PTMSP by immersion in a casting solution comprising isopropyl alcohol and the polymer. Then the fibers were slowly drawn from the solution. The fibers were then immersed in an ethanol bath in order to exchange solvent. The following Table shows the characteristics of the hollow-fiber membranes used. The two different types of support are characteristic of a hydrophobic and a hydrophilic support. In addition, they are representative of two different mechanical strengths. Further details can be found in the following Table.

| hollow-fiber support | outer diameter | pore diameter (determined by bubble point method) |
|---|---|---|
| Accurel PP Q3/2; hydrophobic | 1.0 mm | 0.55 μm |
| Ceramic; α-alumina; hydrophilic | 2.5 mm | 0.12 μm |

The following table shows the results of the characterization of Accurel™ PP Q3/2 coated with PTMSP and ceramic hollow-fiber membranes.

| | Permeance*$^)$, m$^3$/(m$^2 \cdot$ h $\cdot$ bar) | | | Selectivity (α) | |
|---|---|---|---|---|---|
| Sample | $O_2$ | $CO_2$ | $N_2$ | $O_2/N_2$ | $CO_2/N_2$ |
| E I- Ceramic | 1.2 | 3.7 | 0.80 | 1.4 | 4.6 |
| E III - Ceramic | 1.4 | 4.7 | 0.84 | 1.6 | 5.5 |
| E IV - Ceramic | 1.7 | 4.9 | 1.2 | 1.4 | 4.0 |
| F I - Ceramic | 1.8 | 5.1 | 1.4 | 1.2 | 3.6 |
| G II - Accurel PP Q3/2 | 5.9 | 16.8 | 3.9 | 1.5 | 4.3 |
| G V - Accurel PP Q3/2 | 7.3 | 19.3 | 5.8 | 1.3 | 3.3 |

*$^)$In the quantity "permeance," permeability and the thickness of the coating are incorporated In FIG. 1, the change in the permeability of the Accurel™ PP Q3/2 membrane coated with PTMSP is shown for different components. This Figure shows that the permeability only underwent small changes. On the right axis, the selectivity for oxygen/nitrogen is shown (indicated by the black closed circles).

Example 3

Exposure to $CO_2$ Absorbents

Flat sheets of PTMSP membranes were immersed in three different organic $CO_2$ solvents: propylene carbonate, N-methylpyrrolidone and methanol for a period of seven days. The membranes remained structurally intact and exhibited no traces of chemical damage.

Then an exposure test was carried out using a set-up in which $CO_2$ gas was fed to one side of the membrane and liquid absorbent to the other side. Both sides could be brought under pressure and the liquid pressure was continuously higher than the pressure on the gas side. During an experiment, the pressure was varied and the membrane could be inspected for possible leakage. No leakage was detected during the tests, although the transmembrane pressure did become 37 bar. The results of these experiments for the asymmetric PTMSP membranes, with an effective thickness of about 5 μm, are shown in FIGS. 2, 3 and 4.

Figure 5:
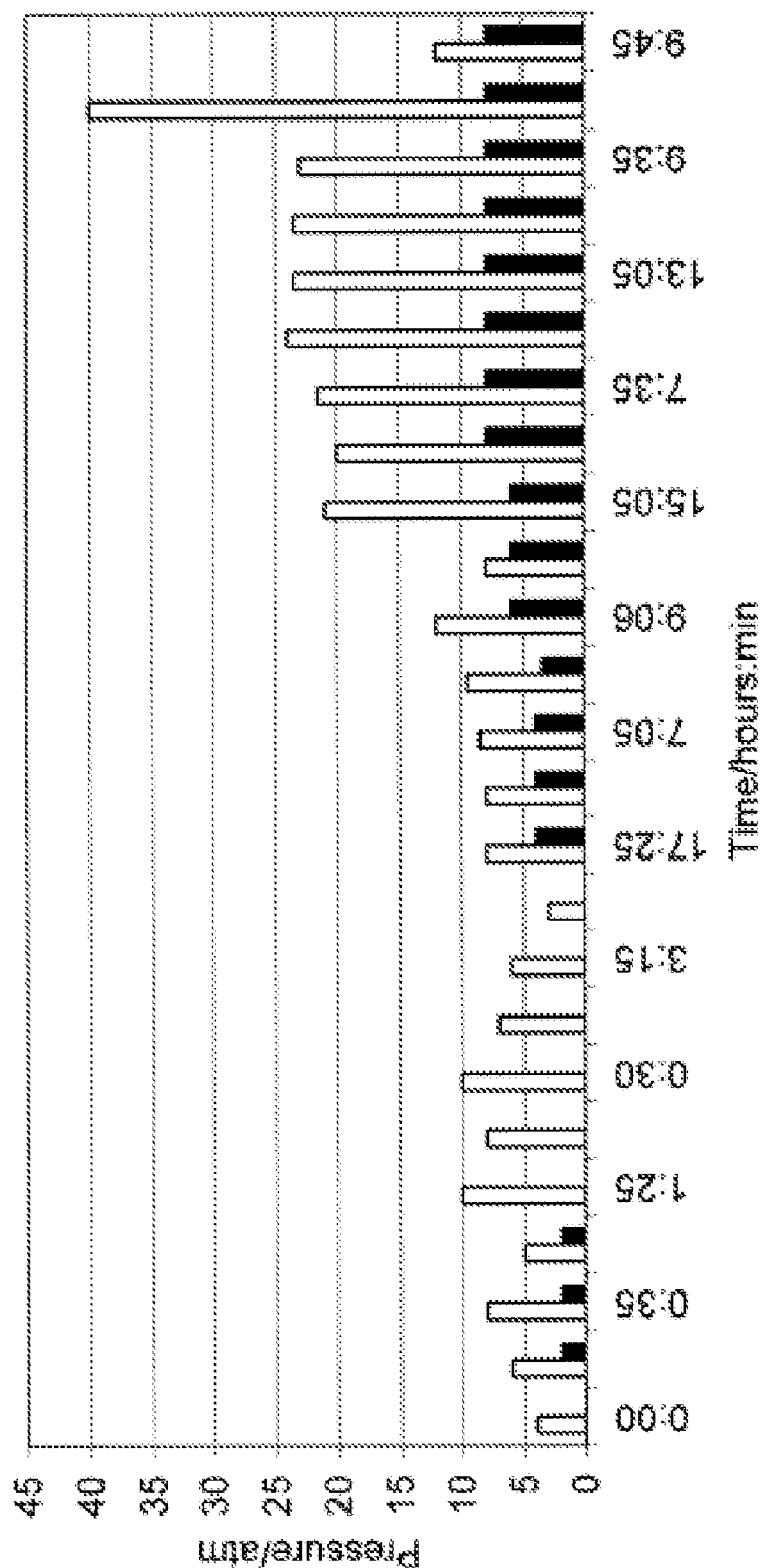
FIG. 5 graphically depicts the exposure to hydraulic and gas pressure. The liquid is propylene carbonate (light grey); the membrane is fluorinated PTMSP; and the gas is $CO_2$ (dark grey).

Then experiments were carried out using an asymmetric fluorinated PTMSP membrane with an effective thickness of 14 μm. At transmembrane pressures of up to 32 bar, no leakage was detected. The results are shown in FIG. 5.

Figure 2:
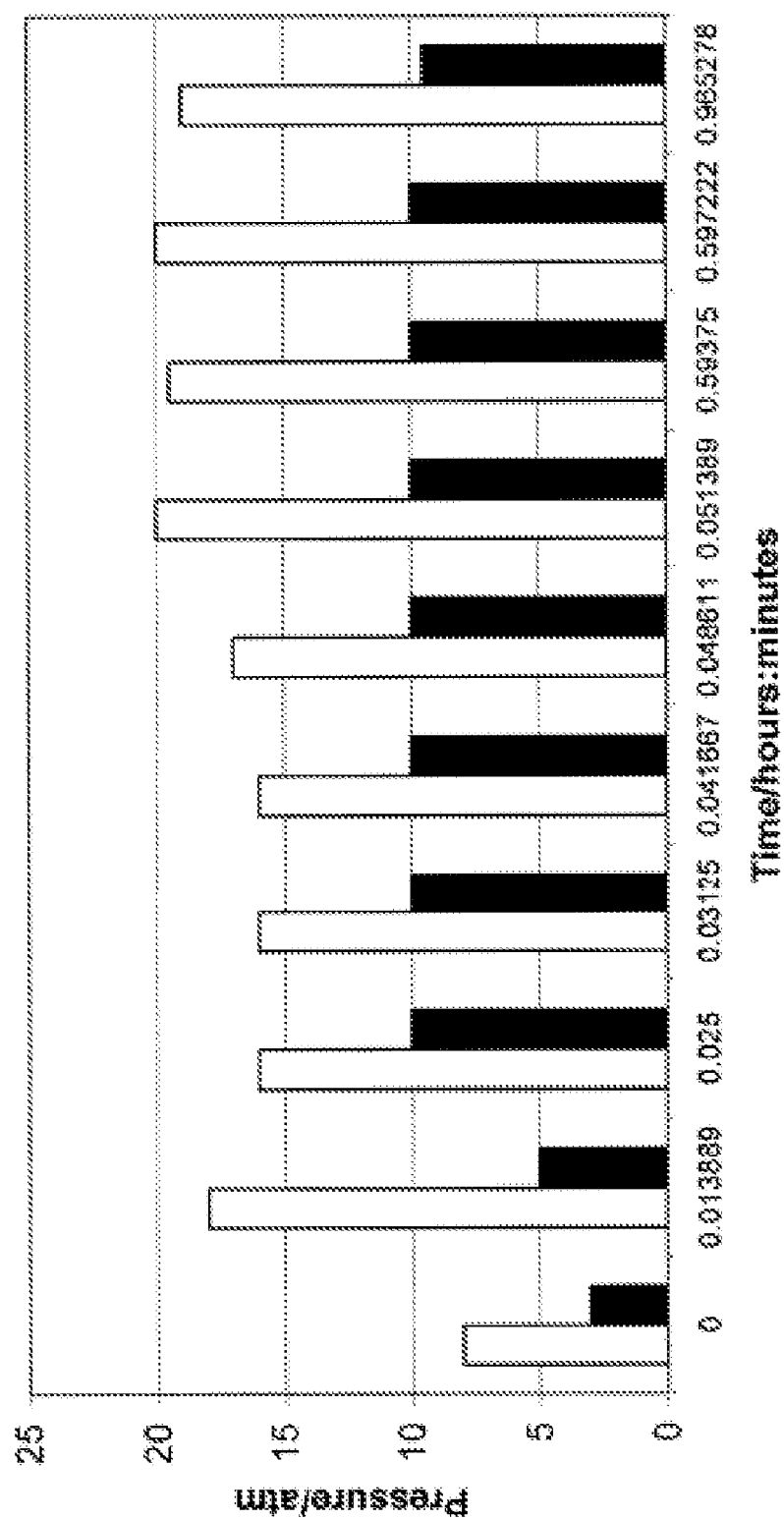
FIG. 2 graphically depicts the exposure to hydraulic and gas pressure. The liquid is water (light grey); the membrane is asymmetric PTMSP; and the gas is $CO_2$ (dark grey).

Caption for FIG. 2: Exposure to hydraulic and gas pressure. Liquid is water (light grey). Asymmetric PTMSP membrane. Gas is $CO_2$ (dark grey).

Figure 3:
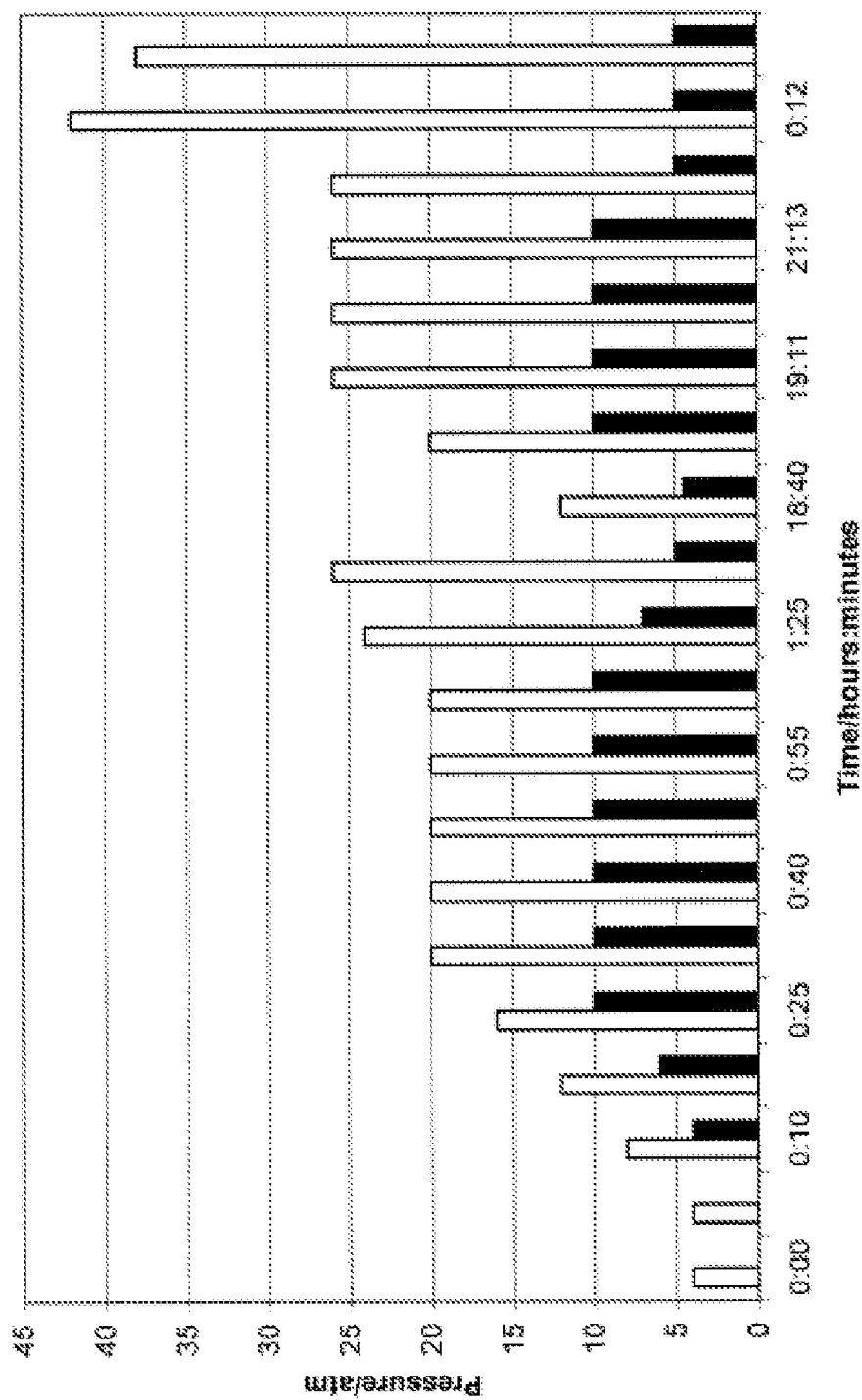
FIG. 3 graphically depicts the exposure to hydraulic and gas pressure. The liquid is propylene carbonate (light grey); the membrane is asymmetric PTMSP; and the gas is $CO_2$ (dark grey).
Figure 4:
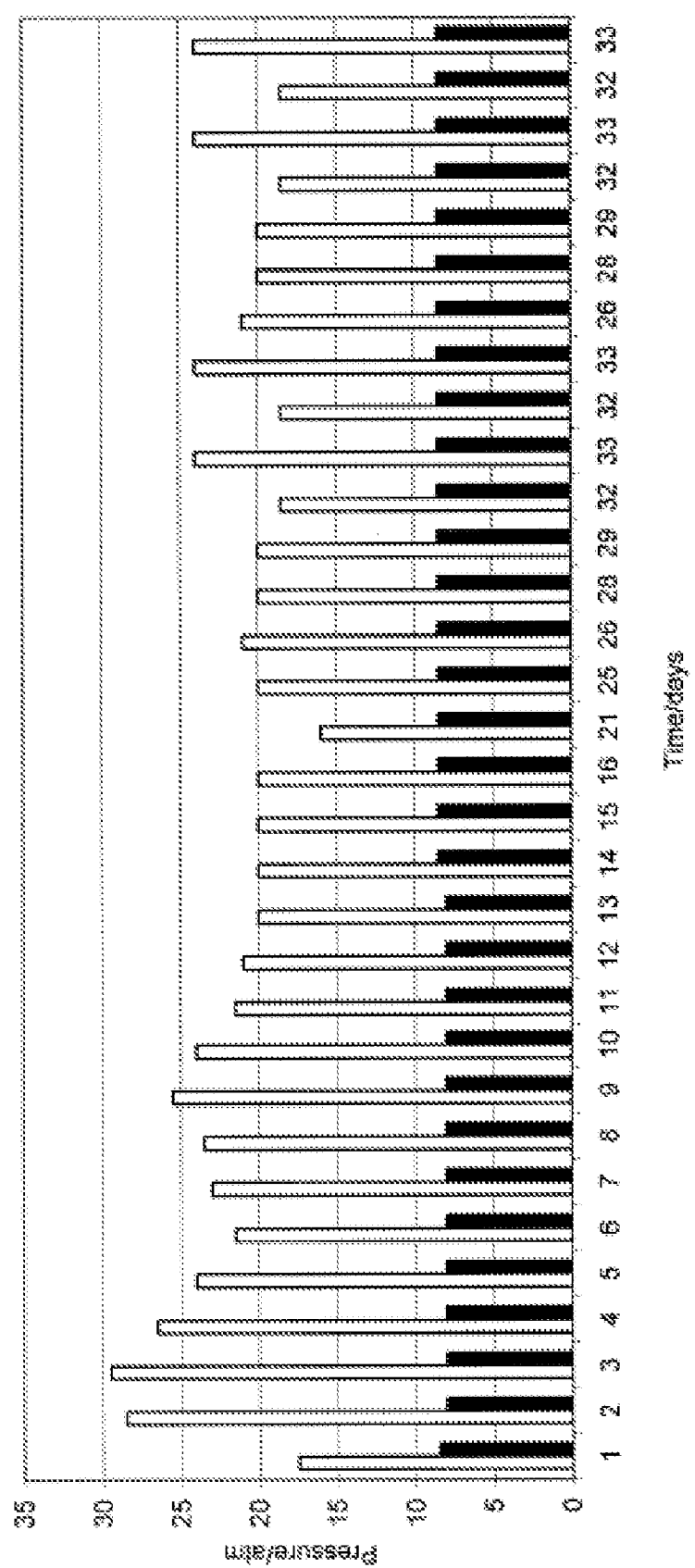
FIG. 4 graphically depicts the exposure to hydraulic and gas pressure. The liquid is solution of 3M $K_2CO_3$ (light grey); the membrane is asymmetric PTMSP; and the gas is $CO_2$ (dark grey).

Caption for FIG. 3: Exposure to hydraulic and gas pressure. Liquid is propylene carbonate (light grey). Asymmetric PTMSP membrane. Gas is $CO_2$ (dark grey).

Caption for FIG. 4: Exposure to hydraulic and gas pressure. Liquid is 3M $K_2CO_3$ solution (light grey). Asymmetric PTMSP membrane. Gas is $CO_2$ (dark grey).

Caption for FIG. 5: Exposure to hydraulic and gas pressure. Liquid is propylene carbonate (light grey). Fluorinated PTMSP membrane. Gas is $CO_2$ (dark grey).

The invention claimed is:

1. A method for separating $CO_2$ from a $CO_2$-rich liquid, comprising a step wherein, under elevated pressure, said liquid is contacted with a membrane based on polyacetylene substituted with trimethylsilyl groups, such that the pressure difference across the membrane is at least 1 bar and that at least a part of the $CO_2$ is transported from the liquid through the membrane.

2. The method according to claim 1, wherein said membrane has a permeability coefficient for $CO_2$ of at least 500 Barrer.

3. The method according to claim 2, wherein said membrane has a permeability coefficient for $CO_2$ from 15,000 to 25,000 Barrer.

4. The method according to claim 1, wherein said membrane comprises PTMSP.

5. The method according to claim 1, wherein said membrane is provided on a plastic or ceramic support.

6. The method according to claim 5, wherein said support comprises a hollow-fiber membrane.

7. The method according to claim 1, wherein said pressure difference across the membrane is 1 to 40 bar.

8. The method according to claim 1, wherein said liquid is chosen from organic liquids or inorganic liquids.

9. The method according to claim 1, which method is part of a $CO_2/H_2$ separation step, or a $CO_2/CH_4$ separation step.

10. A method for degassing liquids at high pressure, comprising a step wherein, under elevated pressure, said liquid is contacted with a membrane based on polyacetylene substituted with trimethylsilyl groups, such that the pressure difference across the membrane is at least 1 bar.

11. The method according to claim 1, wherein said membrane has a permeability coefficient for $CO_2$ of at least 3000 Barrer.

12. The method according to claim 8, wherein said organic liquid is a member selected from the group consisting of propylene carbonate, polyethylene glycol dimethyl ether, N-methylpyrrolidone, methanol and mixtures thereof.

13. The method according to claim 8, wherein said inorganic liquid is water, optionally supplemented with carbonate salts, phosphate salts, amino acid salts or amines.

\* \* \* \* \*